United States Patent [19]
Angelo et al.

[11] Patent Number: 5,748,888
[45] Date of Patent: May 5, 1998

[54] METHOD AND APPARATUS FOR PROVIDING SECURE AND PRIVATE KEYBOARD COMMUNICATIONS IN COMPUTER SYSTEMS

[75] Inventors: Michael F. Angelo, Houston; Jeff W. Wolford, Spring, both of Tex.

[73] Assignee: Compaq Computer Corporation, Houston, Tex.

[21] Appl. No.: 657,982

[22] Filed: May 29, 1996

[51] Int. Cl.$^6$ .................................................. G06F 11/00
[52] U.S. Cl. ........................................................ 395/186
[58] Field of Search ............................. 395/186, 187.01, 395/188.01, 490, 491; 380/3, 4

[56] References Cited

U.S. PATENT DOCUMENTS

| | | | |
|---|---|---|---|
| 4,267,578 | 5/1981 | Vetter | 340/365 R |
| 5,012,514 | 4/1991 | Renton | 380/4 |
| 5,220,501 | 6/1993 | Lawlor et al. | 379/90 |
| 5,359,660 | 10/1994 | Clark et al. | 380/25 |
| 5,377,269 | 12/1994 | Heptig et al. | 380/25 |
| 5,537,544 | 7/1996 | Morisawa et al. | 395/188.01 |
| 5,586,301 | 12/1996 | Fisherman et al. | 395/186 |
| 5,596,718 | 1/1997 | Boebert et al. | 395/187.01 |

OTHER PUBLICATIONS

Ellis,"The Low Power Intel486 SL Microprocessor", IEEE Compcon, pp. 96–102, 1993.

First Virtual Holdings, Inc., "Software–Based Credit Card Encrypting Vulnerable to Automated, Invisible Attacks on the Keyboard" (1996).

Intel486™ SL Microprocessor SuperSet System Design Guide, Nov. 1992, pp. 12–14 through 12–29.

Intel486™ SL Microprocessor SuperSet Programmer's Reference Manuel, Nov. 1992, pp. 6–28 through 6–53.

*Primary Examiner*—Robert W. Beausoliel, Jr.
*Assistant Examiner*—Joseph E. Palys
*Attorney, Agent, or Firm*—Pravel, Hewitt, Kimball & Krieger

[57] ABSTRACT

A method and apparatus for providing secure and private keyboard communications in a computer system. A request for private keyboard communications causes the computer's processor to enter into system management mode by generating an system management interrupt. A secure system management interrupt handler then directs specialized hardware to intercept and divert keyboard interrupts, such that data entered via the keyboard is only communicated to a non-readable black box security device that controls access to protected system resources. Keyboard data is thereby protected from interception by malicious software.

12 Claims, 4 Drawing Sheets

METHOD AND APPARATUS FOR PROVIDING SECURE AND PRIVATE KEYBOARD COMMUNICATIONS IN COMPUTER SYSTEMS

CROSS REFERENCE TO RELATED APPLICATION

The present invention relates to computer system security as does commonly-owned and copending U.S. patent application Ser. No. 08/632,892 entitled "SECURITY CONTROL FOR PERSONAL COMPUTER".

FIELD OF THE INVENTION

The present invention relates to a method and apparatus for providing a secure communication channel in a computer system between the keyboard and a security module.

BACKGROUND OF THE INVENTION

Computer security is becoming increasingly important in today's environment of heavily networked computer systems. Huge amounts of money are invested by companies to purchase software and even more money is spent on developing the information contained in data files such as text documents and spreadsheets. Protecting these resources is therefore an important concern. Security conscious users are requesting that security and integrity features be incorporated into their personal computers to restrict access to data contained on hard drives, as well as information contained in flash ROM and other critical system components. In this context, "software", "program" and "application" refer to executable computer instructions while "data" refers generically to all forms of electronic information operated upon by the instructions, including data entries and files created by the instructions.

One method of offering protection is by the use of passwords. A password is typically stored in battery-backed CMOS RAM memory (CMOS chips also store system configuration information and keep track of the date and time of day). Before the user is allowed access to the computer or secured computer resources, the user is required to enter a password. Once a password is entered, the computer compares the password to the password in CMOS memory and, if they match, the user is allowed access.

A main disadvantage of this system is that certain forms of attack can bypass the CMOS memory because it is not read protected in many cases. To address this concern, passwords can be encoded. Most encoding schemes can be reverse engineered by a sophisticated computer virus or malicious code, however, potentially leading to a costly security breach. Further, the CMOS memory could simply be disconnected from its battery, thus losing the password and any other contents.

A fairly recent design innovation involves the use of flash ROM or EPROM to store the computer's Basic Input Output System (BIOS). Use of flash ROM allows the BIOS to be upgraded by software means, as opposed to the traditional technique of physically replacing a conventional ROM chip. In some systems, a switch was used to control the updating of the flash ROM. The switch method proved to be burdensome and inflexible, usually requiring the programmer to open the computer's chassis. A password approach is more convenient and flexible (passwords can be changed), yet provides some level of security. The password approach must, however, be sufficiently secure so that the password cannot be obtained during the process of updating the flash ROM.

SUMMARY OF THE INVENTION

A computer system according to the present invention provides a secure keyboard communications channel. The secure communications channel prevents critical data entered through a keyboard from being intercepted by malicious software code.

The invention is a further development upon the type of device disclosed in U.S. patent application Ser. No. 08/632,892, entitled "SECURITY CONTROL FOR PERSONAL COMPUTER", filed on Mar. 3, 1995, and hereby incorporated by reference. The prior application describes a security system in which system ROM provides a password at power-on to a "black box" security device. The black box security device controls access to various secured resources of the computer system, such as the flash ROM. Once a password has been downloaded to the security device, a command to protect secured resources is issued to the security device. The command prevents unauthorized access to any of the secured resources. To access a secured resource, the user must thereafter provide the correct password to the security device. The security device can only verify—but does not divulge—the password, thereby enhancing system security. A multitude of passwords or other information could be protected.

Despite its architectural strengths, a potential weakness could possibly exist in the earlier black box approach to security. This vulnerability has been found to lie in the fact that the password must travel from the keyboard to the black box or other secured resource. Keyboard "sniffing" by surreptitious programs having the ability to intercept the password as it is typed can severely undermine system security.

Sophisticated versions of such programs could also be used to intercept mouse-clicks or messages sent to the user's screen. The intercepted information could be saved or secretly transmitted to be used later for unauthorized activities. To date, this problem has not been addressed by computer makers.

The present invention provides a mechanism whereby a computer user can communicate a password or other information to a black box security device in a secure fashion. The problem of keyboard sniffing is essentially overcome. The invention uses the black box technique of the commonly-owned application and adapts it so use can be made of the system management mode (SMM) of modern processors. SMM is entered upon receipt of a system management interrupt (SMI). A useful feature of SMM is that an SMI handler addresses an address space that is separate from ordinary main memory.

In an exemplary application of the invention, an application requiring password enablement first loads appropriate processor registers and then generates a "soft" SMI.

The register values are retrieved by an SMI handler that is located in secure SMI memory (SMRAM). The SMI handler recognizes a secure keyboard request and sets a bit in the keyboard interface. This bit, which can only be enabled while the processor is in SMM, is used to intercept a normal keyboard interrupt. Keystrokes can then be routed directly to the black box for password verification. The keystrokes are not visible to any other processes, and the black box can only be written in this manner.

Password data retrieved via the secure keyboard link is sent to the black box one character at a time. If the password is valid as determined by the status of the black box, the SMI handler allows the access to the secured resource or application. At least two modes of operation are contemplated. In a "secure" mode of operation, the password cannot be altered or faked, but can be viewed as it is typed. In a "private" mode of operation, the password cannot be viewed.

A secured communications channel according to the present invention between a keyboard and protected memory has a variety of potential applications. In addition to secure execution of software, for example, the present invention can be used to safely update the contents of flash ROM, control access to hash codes, or modify system configuration data. Further, the present invention has the advantage of being operating system independent.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Prior to discussing the preferred embodiment of the invention, a general summary of the operation of a typical personal computer incorporating secure keyboard communications circuitry is provided.

Figure 1:
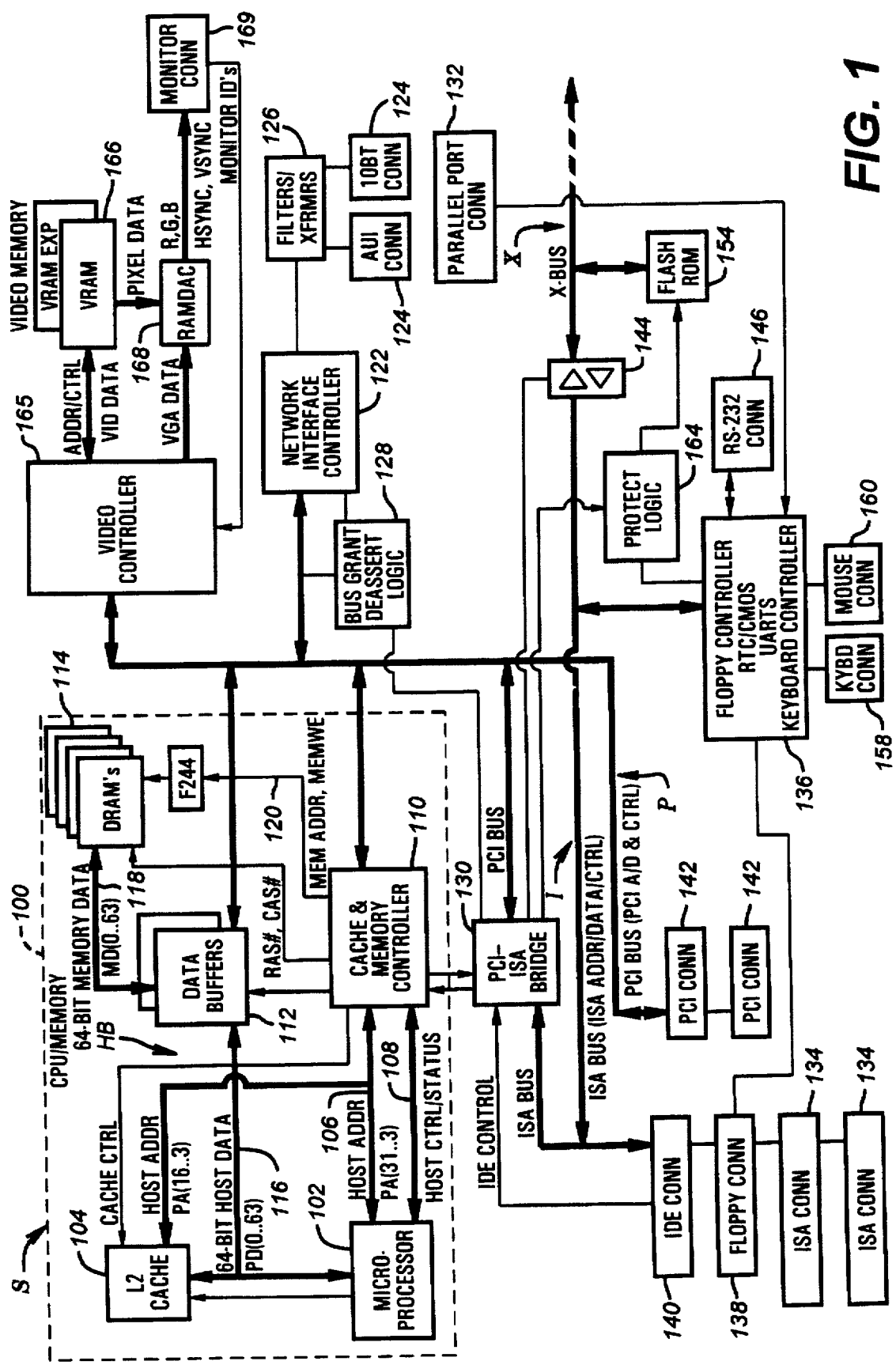
FIG. 1 is a block diagram of a computer system according to the present invention.

Referring to FIG. 1, a computer system S according to the present invention is shown. In the preferred embodiment, the computer system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 is preferably the Pentium® processor from Intel Corporation, but could be an 80486 or any number of similar processors. The processor 102 drives data, address, and control portions 116, 106, and 108 of a host bus HB. A level 2 (L2) or external cache memory 104 is connected to the host bus BB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus 1B. The cache and memory controller chip 110 is configured to control a series of data buffers 112. The data buffers 112 are preferably the 82433LX from Intel, and develop the host data bus 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P.

The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller.

In the disclosed embodiment, the PCI-ISA bridge 130 also includes miscellaneous system logic. This miscellaneous system logic contains counters and timers as conventionally present in personal computer systems, an interrupt controller 180 (FIG. 4)for both the PCI and ISA buses P and I, and power management logic. Additionally, the miscellaneous system logic includes circuitry for a security management system (the "black box" security device 190) according to the present invention. The preferred embodiment of the black box security device 190 (FIG. 4) comprises the following elements: a command register and decoder for the security device, a data/status register for communicating with the computer, an eight byte register file to store a password for each of the protected resources, and password verification logic. A two output decoder 174 (FIG. 4) for intercepting a keyboard interrupt and diverting it to the black box security device 190 is also incorporated in the PCI-ISA bridge 130.

The PCI-ISA bridge 130 also includes circuitry to generate a "soft" SMI (System Management Interrupt), as well as SMI and keyboard controller interface circuitry as described more fully below in conjunction with FIG. 4. The miscellaneous system logic is connected to the flash ROM 154 through read and write protection logic 164, which could be integrated within the PCI-ISA bridge 130. Preferably, the PCI-ISA bridge 130 is a single integrated circuit, but other combinations are possible.

A series of ISA slots 134 are connected to the ISA bus I to receive ISA adapter cards. A series of IDE slots 140 are also provided to the ISA bus I to receive various IDE devices, such as hard disk drives, tape drives and CD-ROM devices (not shown). A series of PCI slots 142 are connected to the PCI bus P to receive PCI adapter cards.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 168 for connecting a monitor (not shown).

A network interface controller (NIC) 122 is also connected to the PCI bus P.

Preferably, the controller 122 is a single integrated circuit that includes the capabilities necessary to act as a PCI bus master and slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a local area network (LAN).

A combination I/O chip 136 is connected to the ISA bus I. The combination I/O chip 136 preferably includes a floppy disk controller, real time clock, two UARTS, and various address decode logic and security logic to control access to the CMOS memory (not shown) and any power-on password values. A control line is provided to the read and write protection logic 164 to further control access to the flash ROM 154. A floppy disk connector 138 for receiving a cable to a floppy disk drive is connected to the combination I/O chip 136 and the ISA bus I. Serial port connectors 146 and parallel port connector 132 are also connected to the combination I/O chip 136.

An 8042 or keyboard controller 156 and IRQ logic 172 (FIG. 4) are also included in the combination I/O chip 136. Interaction between these components is discussed more fully below in conjunction with FIG. 4. The keyboard controller 156 is of conventional design and is connected in turn to a keyboard connector 158 and a mouse or pointing device connector 160. A keyboard 162 (FIG. 2) is connected to the computer system S through the keyboard connector 158.

A buffer 144 is connected to the ISA bus I to provide an additional X bus X for various additional components of the computer system S. A flash ROM 154 receives its control, address and data signals from the X bus X. Preferably, the flash ROM 154 contains the BIOS information for the computer system and can be reprogrammed to allow for revisions of the BIOS.

An additional feature of the computer system S is a System Management Mode (SMM), as discussed at length immediately below. It is also noted that FIG. 1 presents an exemplary embodiment of the computer system S and it is understood that numerous other embodiments could readily be developed as known to those skilled in the art.

The System Management Mode

Certain microprocessors, such as the Pentium® processor from Intel Corporation, have included a mode referred to as system management mode (SMM), which is entered upon receipt of a system management interrupt (SMI). Originally, SMIs were power management interrupts devised by Intel Corporation for portable systems. Portable computers often draw power from batteries which provide a limited amount of energy. To maximize battery life, an SMI is asserted to turn off or reduce the power to any system component that is not currently in use. Although originally meant for laptop models, SMIs have become popular for desktop and other stationary models as well.

SMIs are asserted by either an SMI timer, by a system request, or by other means. An SMI is a non-maskable interrupt having almost the highest priority in the system. Only the reset signal R/S* and cache flush signal FLUSH*, which can be conceptualized as interrupts, have a higher priority than the SMI. When an SMI is asserted, a microprocessor 102 maps a portion of memory referred to as the system management memory (SMRAM) into the main memory space. The entire CPU state is then saved in the SMRAM in stack-like, last in/first out fashion. After the initial processor state is saved, the processor 102 begins executing an SMI handler routine, which is an interrupt service routine to perform specific system management tasks, like reducing power to specific devices or, as in the case of the present invention, providing security services. While the routine is executed, other interrupt requests are not serviced, and are ignored until the interrupt routine is completed or the microprocessor 102 is reset. When the SMI handler completes its task, the processor state is retrieved from the SMRAM, and the main program continues. An SMI active signal referred to as the SMIACT* signal is provided by the processor 102 to indicate operation in SMM.

As mentioned, following assertion of its SMI input (this is generally an active low signal), the processor 102 calls the SMI handler which addresses an address space that is separate from ordinary main memory. Thereafter, all memory accesses refer only to SMRAM. I/O accesses via instructions such as IN or OUT are still directed to the normal I/O address space, however. One advantageous side-effect of the hardwired separate address SMM area is that the routines stored in this space cannot be snooped by the cache, providing an additional layer of protection.

In a typical system management mode implementation, it is intended that battery-buffered SRAM chips be mapped into the address space between 30000h and 3ffffh by default. External hardware can use the SMIACT* signal as a chip select signal and thereby address either the SRAM chips (the SMIACT* signal is at a logic low level), or the normal main memory (the SMIACT* signal is at a logic high level). By using the SMIACT* signal, then, SMM memory and normal memory can be strictly separated.

The Pentium® or P5 microprocessor is more flexible than earlier processors in that it permits the SMI handler starting address and the location of the SMRAM space to be changed by the user. Under the Pentium® design, the SMI starting address stored in the microprocessor register is initially set to the conventional 30000h value. Consequently, when the first SMI is asserted, the SMI handler starts at address 38000h. While the SMI handler routine is executing, however, it may provide a different area of memory to be used as the SMRAM. This new SMRAM may start at any location in the main memory space chosen by the programmer. The SMRAM comprises a 64 Kbyte block beginning at the new SMRAM start address. When the SMI handler finishes, the new starting address replaces the old starting address in the microprocessor's SMI starting address register.

When the next SMI is asserted, the microprocessor 102 maps the new 64 kbyte block of memory into the main memory space as the SM and starts the SMI handler at the new starting address at the midpoint of the new SMRAM. For example, during the first SMI service routine, the programmer may change the SMRAM starting point from 030000h to 100000h. When the SMI is next asserted, the microprocessor 102 maps the SMRAM into main memory space between 100000h and 10FFFFh. The microprocessor 102 then references address 108000h for the SMI handler. This feature thus allows the programmer to choose a more convenient location in the main memory.

Computer System Security

One general class of threat to system security is the so called "Trojan horse" attack. This is a program that is designed or has been modified to perform some hostile act, but is disguised as a familiar or non-threatening program, or it may be hidden with entrusted system programs. Examples of these types of programs include screen savers or keyboard drivers. Innocuous appearing malicious code can be particularly effective at obtaining security-sensitive data, such as passwords. Heuristic techniques could be utilized to determine if a user is entering a password or other information.

In DOS, it is easy for a programmer to "hook" the keyboard interrupts and copy the information as it is being transmitted. In Windows® 3.X, Windows® 95 and Windows® NT, cursor events and character keydown/keyup events can similarly be taken advantage of to gain illicit access to presumptively secure information. To keep the password or other sensitive information from being visible to malicious code, it can be communicated directly to a "black box" security device 190 via a secure keyboard link. Password data retrieved via the secure keyboard link is sent to the black box 190 one character at a time. The keystrokes are not visible to any other processes, and the black box 190 can only be written in this manner.

As discussed more fully below, the secure keyboard link is established by utilizing the processor's system management mode. By utilizing the black box 190 in conjunction with SMM, the password data as well as user-entered keystrokes are not stored in normal readable memory, preventing them from being surreptitiously obtained. The secured keyboard link is initiated by the SMI handler. The SMI handler, because of the nature of SMI, is not writable while the system is running normally. Further, this code can only be executed while the system is in SMI.

Figure 2:
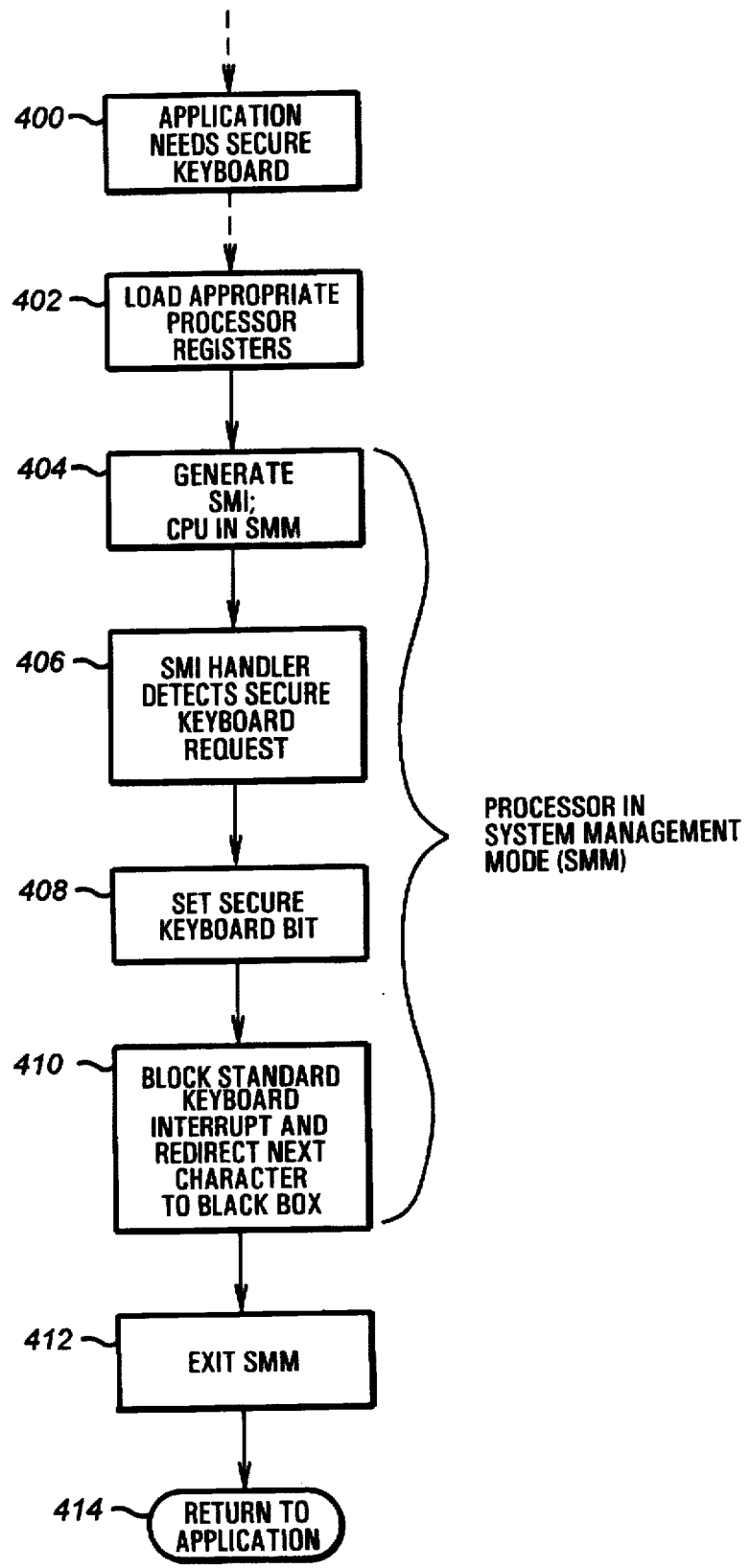
FIG. 2 is a flowchart illustration of a procedure according to the present invention for securely obtaining a character.

Referring now to FIG. 2, a procedure accordingly to the present invention for securely obtaining a single keyboard character is illustrated. The procedure commences in step 400 when an application requires a secure keyboard for protected entry of a keyboard character. Control then proceeds to step 402 where appropriate registers in processor 102 are loaded by the application prior to execution of the SMI code. The register values indicate a request for secured keyboard communications. Control next proceeds to step 404 where the application generates a "soft" SMI that is essentially a software interrupt (analogous to a BIOS software interrupt call procedure). The soft SMI in turn places the processor 102 in SMM.

In addition to the programmatic interface, other methods of generating an SMI are also contemplated. As examples, the SMI could be initiated by a specified keystroke sequence or by pressing a specialized key used to place the system in SMM. The precise manner in which the SMI is generated is not critical to the invention. The SMI need only be generated such that the SMI handler recognizes that a secure keyboard link is needed.

Following an SMI in step 404, control passes to step 406 where the processor 102, now in SMM, executes the code in the memory address where the SMI handler resides. The SMI handler first examines the appropriate processor 102 registers to determine what type of process initiated the SMI request. The processor 102 recognizes the type of SMI call that has been initiated (in the present example, a secure keyboard request) by the data stored in the processor 102 registers. Once the request is identified as a request for secure keyboard communications, the SMI handler then executes the routine used to intercept a keyboard interrupt. The keyboard interrupt is assumed to be IRQ1 for purposes of this specification.

Control next proceeds to step 408 where the SMI handler sets a secure keyboard bit that functions to activate circuitry for intercepting IRQ1. The secure keyboard bit can only be set while the processor 102 is in SMM, and is therefore secure. A representative hardware implementation is provided below in conjunction with FIG. 4. Control then proceeds to step 410, where the special hardware blocks the standard keyboard interrupt IRQ1 normally associated with a keystroke. The character code associated with the blocked interrupt is then directed to the black box security device 190. Since the keyboard interrupt IRQ1 is blocked, malicious code that awaits this interrupt is never activated. In fact, in the disclosed embodiment, secured keystrokes are not visible to any other processes. In addition, the black box security device 190 can only be written in the described manner. As mentioned above, the black box security device 190 can be located in standard I/O memory, but is protectable. Control next proceeds to step 412 where SMM is exited, and then to step 414 where a return to the application is made.

Figure 3:
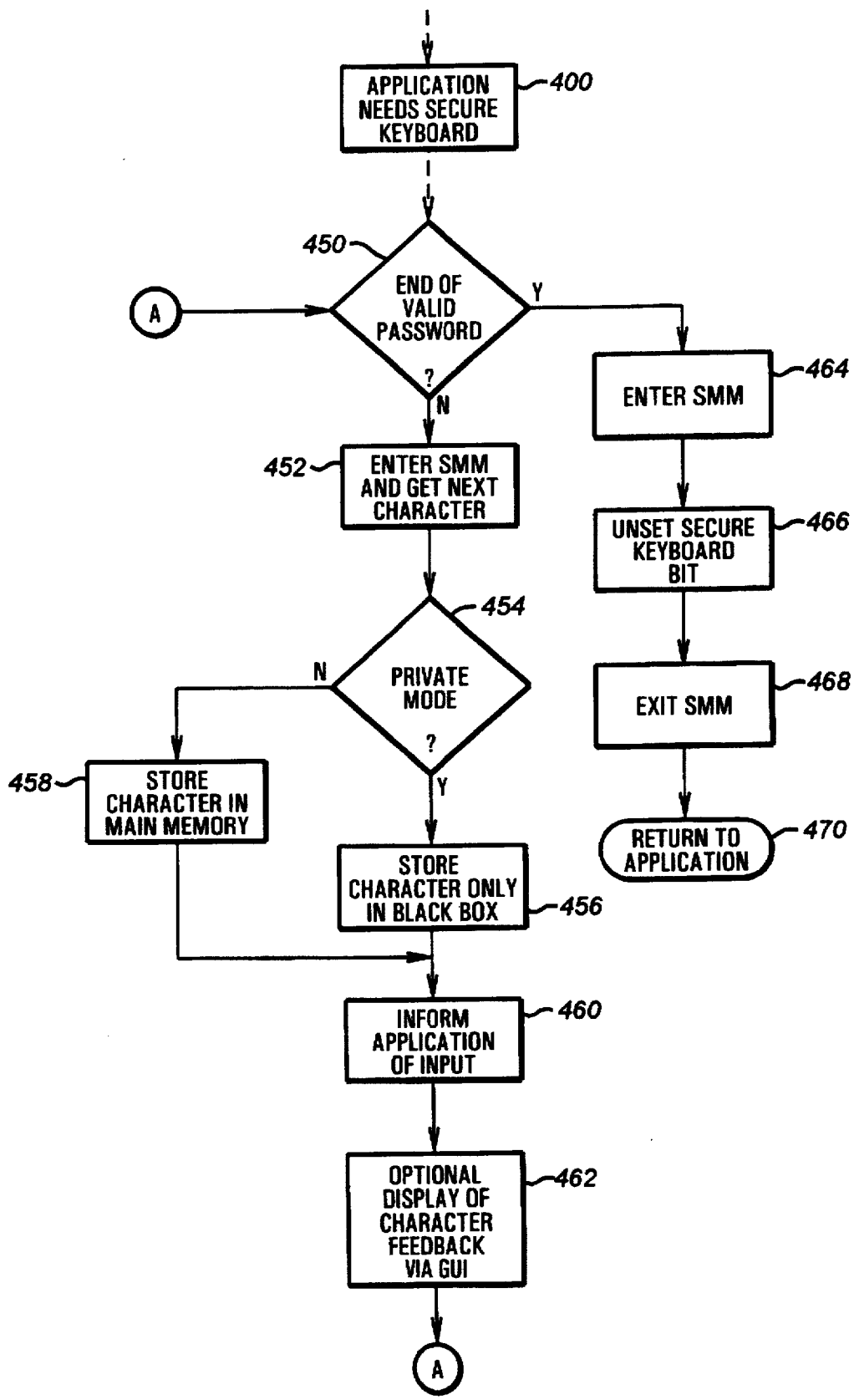
FIG. 3 is a flowchart illustration of a procedure for obtaining a complete password in accordance with the procedure of FIG. 2.

Referring now to FIG. 3, the procedure for obtaining a complete password in accordance with the procedure of FIG. 2 is shown. Control again commences at step 400 when a software application requires a secured keyboard 162. Control proceeds to step 450 where a determination is made if the entire valid password has been entered by the user. If not, control proceeds to step 452 and the processor 102 is placed in SMM while the SMI handler retrieves the next character. During step 452, each successive character in the password is retrieved in the manner described above and shown in FIG. 2. Also in this step, the SMI handler sets an end-of-password flag if the end of the password has been reached.

Control next proceeds to step 454 where the display mode is determined based on register settings. At least two modes of operation are contemplated. In a "secure" mode of operation, the password cannot be altered or faked but can be viewed as it is typed. In a "private" mode of operation, the password cannot be viewed. If the secured keyboard link is in the private mode of operation, control passes to step 456 and the entered character is only sent to the black box 190. If the system is in the secured mode of operation as determined in step 454, control passes to step 458 and the entered character is also stored in main memory.

Following either of steps 456 or 458, control proceeds to step 460 and the application is notified of the results of the comparison made between the entered character and the corresponding character stored in the black box 190 memory. Following this step, SMM is exited and control proceeds to step 462 for optional display of the entered character feedback via a graphical user interface (GUI). Numerous options are available at this point. It is contemplated, for example, that a character such as an "X" or a "*" could be echoed back to the monitor screen.

Leaving SMM in step 460 has important advantages. For example, minimizing the time spent in SMM aids in maintaining network connectivity. Normal interrupts are not recognized while in SMM, which can cause a user to drop off the network. Thus, by not polling for the next character while in SMM, the secured keyboard link can be relatively transparent to normal system operation.

From step 462, control returns to step 450 to again determine if the end of the password has been entered and, if so, if the password is valid as entered. Examination of the end-of-password flag is the preferred method. If the end of the password has not been entered, the application again generates a soft SMI in order to securely obtain the next password character.

If the password is valid as determined by the status of the black box 190 in step 450, the SMI handler allows access to the secured resource or application. Prior to this occurrence, however, control proceeds to step 464 and another soft SMI causes the processor 102 to return to SMM. Control next proceeds to step 466 where the secured keyboard bit in the keyboard interface (FIG. 4) is cleared. Optionally, secured portions of code could be executed at this point in program flow. Control then proceeds to step 468 where SMM is exited. Finally, control proceeds to step 470 for a return to normal application execution.

A wide variety of applications are contemplated for use with the secured keyboard link. For example, if a password is valid as determined by the status of the black box 190, the SMI handler could be directed to execute any type of secured command. Options include disabling the write protect bit of a flash ROM memory in order to update BIOS or securely allowing access to unlock bits in NVRAM to accomplish administrative functions such as reconfiguration of hardware.

In the past, if a user wanted to reconfigure hardware, it was often necessary to reboot the computer to recycle power. During system powerup, the F10 key must normally be pressed in order to unlock configuration memory. In a system according to the present invention, however, configuration memory can be updated during normal system operation in a safe and secure fashion. It is also contemplated that execution of various encryption software could be predicated on entry of a valid password.

Other potential applications include secure access to security hash tables and hash algorithms for verifying the trustworthiness of applications prior to execution. The invention could also be used to verify an administrative password used to permit access to the computer system. A secure hash value for the administrative password could be stored in NVRAM that is locked and not readable except when the system is in SMM. Once retrieved by the SMI handler, this hash value could be securely compared (in SMM) with a hash value generated for the user-entered password. Many other undisclosed applications for the present invention have also been considered.

Figure 4:
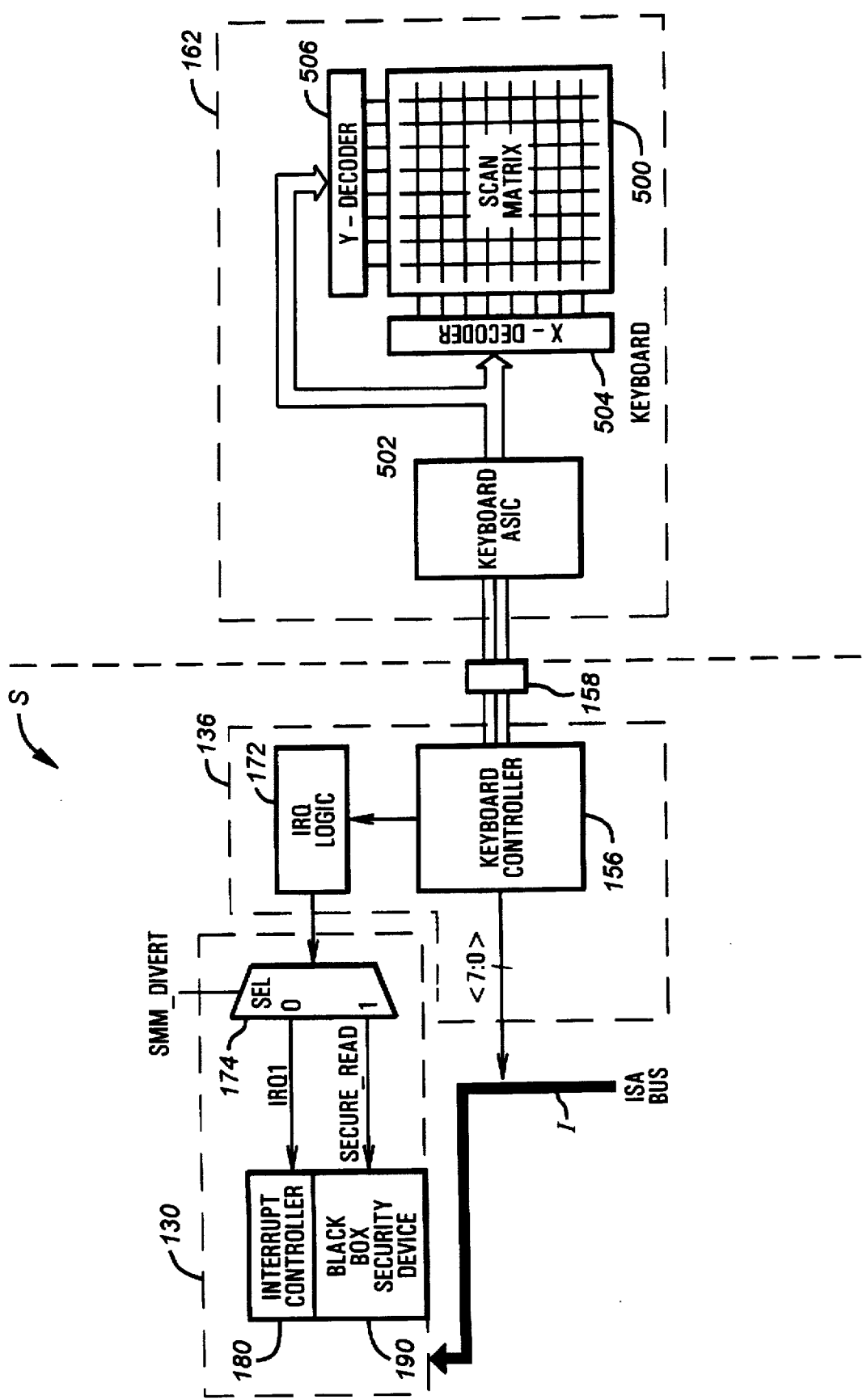
FIG. 4 is schematic diagram of a contemplated hardware implementation of the present invention.

A contemplated hardware implementation of the present invention is illustrated in FIG. 4. Referring to this figure, a keyboard 162 is shown attached to a computer system S via a keyboard connector 158. The keyboard 162 interface includes a keyboard application specific integrated circuit (ASIC) 502 and a keyboard controller 156. Typical keyboard microcontrollers include the 8048 and 8051 from Intel Corporation. The keyboard ASIC 502 supervises a scan matrix 500, formed of crossing X and Y lines. At each of the crossing lines, a small switch (not shown) is located. Upon depression of a key, the switch is closed.

The keyboard ASIC 502 is able to detect and decipher closed switches by monitoring the status of the scan matrix 500. To accomplish the monitoring, the keyboard ASIC 502 uses an X-decoder 504 and a Y-decoder 506. The keyboard ASIC 502 activates successively and individually the X lines via the X decoder 504 and detects the Y line from which it receives a signal. By monitoring the X and Y coordinates, the keyboard ASIC 502 can unambiguously identify any depressed keys. Once a keystroke has been identified, the keyboard ASIC 502 writes a corresponding code into a keyboard internal buffer (not shown). The keyboard ASIC 502 then transmits the code as a serial data stream over the connection cable linking the keyboard 162 to the keyboard controller 156 contained within the combination I/O chip 136.

Upon reception of keyboard data, the keyboard controller 156 directs the IRQ logic 172 to generate an interrupt, normally on IRQ1. During normal operation, the interrupt causes the system processor 102 to retrieve and process a byte of data from a keyboard FIFO (not shown) over the ISA bus I. An 8 bit bus between the keyboard controller 156 and the ISA bus I is provided for this purpose.

In an exemplary embodiment of a system according to the present invention, the interrupt generated by the IRQ logic 172 is communicated to the input of a two output decoder 174 or other type of gating circuit. The select bit of the two output decoder 174 is driven by a signal SMM_DIVERT. The SMM_DIVERT signal can only be set by the SMI handler routine. During normal system operation, the signal is at a logic low level and any interrupt generated by the IRQ logic 172 is routed to the "0" output of the decoder 174 and communicated to the interrupt controller 180 over the IRQ1 line. In the disclosed embodiment, the interrupt controller 180 and two output decoder 174 are integrated within the miscellaneous system logic of the PCI-ISA bridge 130.

When an application requests a secure keyboard link and an SMI is generated according to FIG. 2, the SMI handler routine asserts the signal SMM_DIVERT (the secure keyboard bit of step 408). It is appreciated that the signal SMM_DIVERT could be asserted in a variety of ways, as would be evident to those skilled in the art.

Any subsequent keyboard interrupt caused by a keystroke is diverted to the "1" output of the decoder 510. A signal at this output, referred to as the SECURE_READ signal, is in turn communicated to the black box 190 contained within the miscellaneous system logic of the PCI-ISA bridge 130. Assertion of the SECURE_READ signal causes the keyboard data to be read from the ISA bus I by the black box 190, and only by the black box 190. Again, the ISA bus I cannot be snooped by malicious code during this process.

It is also contemplated that the invention could be utilized in a system incorporating a serial bus for peripherals that conforms to the Universal Serial Bus (USB) specification. In this alternate embodiment of the invention, a keyboard ASIC 502 communicates with a USB host controller as shown in commonly-owned and copending U.S. patent application Ser. No. 08/506,884, entitled "UNIVERSAL SERIAL BUS KEYBOARD SYSTEM" and hereby incorporated by reference. In such a system, the two output decoder 174 (or functionally equivalent circuitry) may be positioned within the USB host controller to intercept and divert the appropriate "keyboard" interrupt signal to the black box security device 190 following a secure keyboard request. Except for this modification, operation of the disclosed embodiment remains essentially unchanged in a USB system.

Thus, a method and apparatus for providing secure and private keyboard communications has been described. An application utilizing the invention causes the computer's processor to enter into system management mode by generating an SMI. A secure SMI handler then directs specialized hardware to intercept and divert keyboard interrupts, such that data entered via the keyboard is only communicated to a black box security device that controls access to protected system resources. Data can thereby be entered with little fear that it will be intercepted by malicious software.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for securely communicating data from a keyboard to a non-readable security device in a computer system having a processor incorporating system management mode or similar capabilities, the keyboard and computer system being coupled via a keyboard interface, the method comprising the steps of:

generating a system management interrupt in response to a request for secure communications;

placing the processor in system management mode to execute a system management interrupt handler as a result of said step of generating a system management interrupt;

entering keystroke data via a keyboard, wherein a keyboard interrupt is also generated;

setting a secured keyboard bit or otherwise communicating a command that causes specialized circuitry in the keyboard interface to intercept the keyboard interrupt;

rerouting the keyboard interrupt or a signal generated therefrom to the non-readable security device to indicate the presence of keyboard data; and diverting the keystroke data to the non-readable security device in response to the step of generating a system management interrupt in response to a request for secure communications.

2. The method of claim 1 further comprising the steps of:

comparing the diverted keystroke data to protected data stored in the non-readable security device, wherein the comparison occurs in the non-readable security device; and communicating the results of the comparison to other computer system resources through an output of the non-readable security device.

3. The method of claim 1 further comprising the steps of:

prior to said step of generating a system management interrupt, loading appropriate data into processor registers to indicate, to the system management interrupt handler, a request for a secure communications link between the keyboard and the non-readable security device.

4. The method of claim 1, further comprising the step of:

exiting system management mode shortly after the keystroke data has been diverted to the non-readable security device, such that the computer system is in system management mode for a minimal period of time.

5. A method for secure retrieval of data from a keyboard into a computer system, the computer system having a keyboard interface for connecting the keyboard, the computer system further having a non-readable security device containing protected password data or other critical information and a processor incorporating system management mode capabilities, the method comprising the steps of:

loading appropriate data into processor registers to communicate to a system management interrupt handler a request for a secure communications link between the keyboard and the non-readable security device;

generating a system management interrupt in response to a request for secure retrieval of data, whereby the system management interrupt places the computer system in system management mode to execute a system management interrupt handler, wherein execution of the system management interrupt handler comprises the steps of:

retrieving the appropriate data from the processor registers; and directing the processor to set a secure keyboard bit or otherwise communicate a command to specialized circuitry in the keyboard interface directing the specialized circuitry to intercept the next keyboard interrupt;

entering secure keystroke data via a keyboard, whereby a keyboard interrupt is also generated;

intercepting the keyboard interrupt and communicating a signal from the specialized circuitry to the non-readable security device, the signal from the specialized circuitry indicating the presence of secure keystroke data;

diverting the secure keystroke data to the non-readable security device in response to the signal from the specialized circuitry;

comparing the diverted secure keystroke data to the protected password data or other critical information stored in the non-readable security device; and repeating the prior steps until entry of an entire password or other critical data has been completed.

6. The method of claim 5, further comprising the step of:

following the step of diverting the secure keystroke data to the non-readable security device, displaying the secure keystroke data on a graphical user interface.

7. The method of claim 5, further comprising the step of:

following the step of diverting the secure keystroke data to the non-readable security device, displaying a character or group of characters on a graphical user interface, the character or group of characters symbolizing the entry of a secure keystroke but not the actual secure keystroke data.

8. A computer system incorporating the capability to securely communicate data between a keyboard and a non-readable security device, the computer system comprising:

a processor including system management mode capabilities;

a keyboard for entering keystroke data;

a keyboard controller electrically coupled to said keyboard for receiving the keystroke data and communicating it to a system bus;

interrupt generating logic responsively coupled to said keyboard controller, said interrupt generating logic producing a keyboard interrupt upon detection of keystroke data;

an interrupt controller for receiving the keyboard interrupt;

a non-readable security device electrically coupled to said system bus;

a system management mode memory for storing a system management interrupt handler routine that executes in response to requests for secure communications;

a gating circuit for selectively intercepting said keyboard interrupt prior to reception by said interrupt controller, said gating circuit being electrically coupled to said interrupt generating logic, said interrupt controller and said non-readable security device, said gating circuit being responsive to the execution of said system management interrupt handler in response to a request for secure communications such that said gating circuit intercepts the keyboard interrupt and communicates a control signal to said non-readable security device directing said non-readable security device to retrieve keystroke data from said system bus.

9. The computer system of claim 8, wherein said gating circuit is a decoder having a control bit responsive to said system management interrupt handler routine.

10. The computer system of claim 9, wherein one output of said decoder is coupled to said interrupt controller in order to communicate a keyboard interrupt to said interrupt controller during normal computer system operation, and wherein a second output of said decoder is coupled to said non-readable security device in order to direct said non-readable security device to retrieve keystroke data from said keyboard controller during periods of secure communication.

11. The computer system of claim 8, wherein said keyboard controller and said interrupt generating logic are integrated into a single circuit.

12. The computer system of claim 8, wherein said keyboard, said keyboard controller and said interrupt generating logic are effectively compliant with the universal serial bus standard.

* * * * *